No. 843,675. PATENTED FEB. 12, 1907.
W. M. GIBSON.
COTTON CHOPPER.
APPLICATION FILED NOV. 22, 1906.
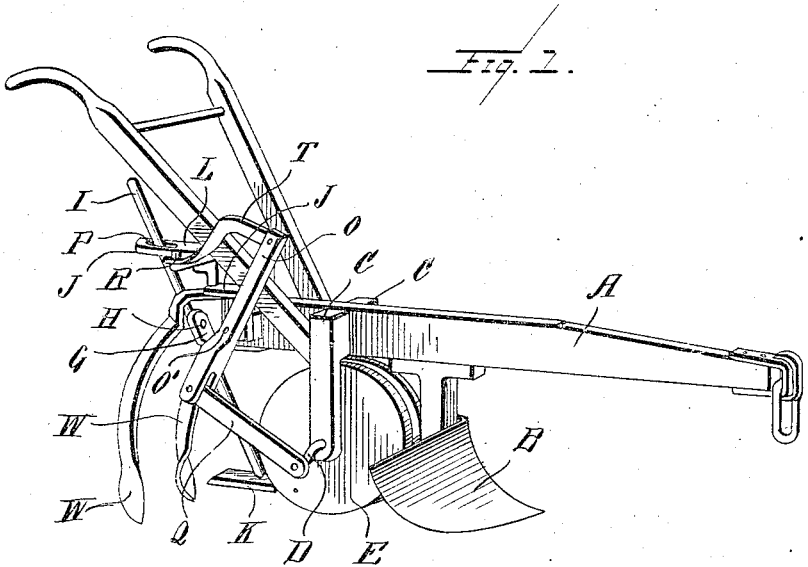
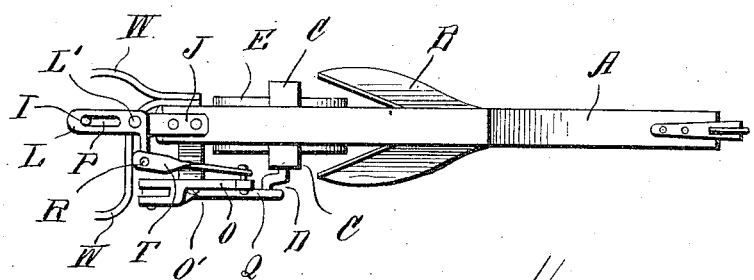
WITNESSES INVENTOR
W. M. Gibson
BY Franklin H. Hough
Attorney

UNITED STATES PATENT OFFICE.

WILLIAM M. GIBSON, OF POPLAR CREEK, MISSISSIPPI.

COTTON-CHOPPER.

No. 843,675.   Specification of Letters Patent.   Patented Feb. 12, 1907.

Application filed November 22, 1906. Serial No. 344,571.

*To all whom it may concern:*

Be it known that I, WILLIAM M. GIBSON, a citizen of the United States, residing at Poplar Creek, in the county of Montgomery and State of Mississippi, have invented certain new and useful Improvements in Cotton-Choppers; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in cotton-choppers, and consists in the provision of various details of construction and combinations and arrangements of parts, which will be hereinafter fully described and then defined in the appended claims.

I illustrate my invention in the accompanying drawings, which form a part of this specification, and in which—

Figure 1 is a perspective view of my improved cotton-chopper, and Fig. 2 is a top plan view.

Reference now being had to the details of the drawings by letter, A designates the beam of the apparatus, to which is fixed the drill-plow B in any suitable manner, and C C designate arms which are fastened to said beam and in which a crank-shaft D is journaled, said shaft having mounted thereon a grooved wheel E, which rotates with the shaft. Fixed to the rear end of the beam is a bracket-arm G, the outer angled end of which projects a slight distance in the rear of the end of the beam and carries a pivot-pin H, upon which the rod I is adapted to have a tilting movement. A chopper-blade K is fixed to the lower end of said rod and is designed to chop the weed and soil upon either side of the row of cotton as said rod is rocked upon its pivot in the manner which will be presently described. O designates a tilting lever mounted upon the pivot O', which projects from the beam, and Q designates a pitman-rod pivotally connected to the lower end of said lever and also pivotally connected to the crank of said shaft, whereby as the wheel rotates said lever may be given a tilting movement. J designates an angle-bar, which is fixed to the upper face of said beam, and L is an angle-lever pivotally mounted upon the pivot-pin L' in a horizontal position upon said angle-bar J, and one end of said angle-lever is provided with an elongated opening P, through which the rod carrying the scraper is adapted to pass. The other end of the angle-lever is provided with a pin R, upon which the angled link T is pivotally mounted, which hook is adapted to be pivotally connected to the upper end of said lever O.

Fixed to the rear end of the beam are two scraper-arms W W, so positioned that they will mellow the ground upon either side of the drill or row of cotton.

The operation of my apparatus will be simple and as follows: The shovel or plow passing over the row will cut the weeds on either side of the row, the grooved wheel passing over the plants without injury thereto, while the chopper, which is swung from side to side from the connections shown in the grooved wheel, will serve to cut the weeds and mellow the ground intermediate the plant, while the scrapers following behind the chopper will mellow up the ground upon either side of the row.

What I claim to be new is—

1. A cotton-chopper comprising, in combination with a beam, a plow secured thereto, grooved wheel mounted in suitable hangers fixed to the beam, an angle-lever pivotally mounted upon the beam, a pivotal lever mounted upon the beam, a crank-shaft with which said wheel rotates, pitman connection between said crank-shaft and lever, connections between said crank and pivotal levers, a pivotal rod with scraper at the lower end thereof, said rod being adapted to be tilted by said angle-lever, as set forth.

2. A cotton-chopper comprising, in combination with a beam, a plow secured thereto, grooved wheel mounted in suitable hangers fixed to the beam, an angle-lever pivotally mounted upon the beam, a pivotal lever mounted upon the beam, a crank-shaft with which said wheel rotates, pitman connection between said crank-shaft and lever, connections between said crank and pivotal levers, a pivotal rod with scraper at the lower end thereof, said rod being adapted to be tilted by said angle-lever and said angle-lever having an aperture through which said rod passes, as set forth.

3. A cotton-chopper comprising a beam, a hanger fixed thereto, a crank-shaft mounted in said beam, a grooved wheel fixed to said shaft, pivotal lever mounted upon the beam, pitman connections between said lever and crank-shaft, an angle-bar fixed to the beam, an angle-lever pivotally mounted in a horizontal plane upon the angle end of said bar, a tilting rod connected to the beam, scraper upon said rod, the upper end of said rod extending through an aperture in said angle-lever adapted to be tilted thereby and connections between said angle and tilting levers, as set forth.

4. A cotton-chopper comprising a beam, a hanger fixed thereto, a crank-shaft mounted in said beam, a grooved wheel fixed to said shaft, pivotal lever mounted upon the beam, pitman connections between said lever and crank-shaft, an angle-bar fixed to the beam, an angle-lever pivotally mounted in a horizontal plane upon the angle end of said bar, a tilting rod connected to the beam, scraper upon said rod, the upper end of said rod extending through an aperture in said angle-lever adapted to be tilted thereby, a pin projecting from said angle-lever, an angled link pivotally mounted upon said pin and having its free end engaging an aperture in said tilting lever, as set forth.

In testimony whereof I hereunto affix my signature in the presence of two witnesses.

W. M. GIBSON.

Witnesses:
W. A. McCLELLAN,
JERRIE OVERSTREET.